US007549774B2

(12) United States Patent
Tsai

(10) Patent No.: US 7,549,774 B2
(45) Date of Patent: Jun. 23, 2009

(54) LED LAMP WITH PLURAL RADIALLY ARRANGED HEAT SINKS

(75) Inventor: Chin Sung Tsai, Sinjhuang (TW)

(73) Assignee: Hong Kuan Technology Co., Ltd., Sinjhuang, Taipei County (TW)

( * ) Notice: Subject to any disclaimer, the term of this patent is extended or adjusted under 35 U.S.C. 154(b) by 241 days.

(21) Appl. No.: 11/790,301

(22) Filed: Apr. 24, 2007

(65) Prior Publication Data

US 2008/0266866 A1 Oct. 30, 2008

(51) Int. Cl.
*F21V 29/00* (2006.01)
*B60Q 1/06* (2006.01)

(52) U.S. Cl. ....................................... 362/294; 362/373

(58) Field of Classification Search ................. 362/294, 362/373

See application file for complete search history.

(56) References Cited

U.S. PATENT DOCUMENTS 7,144,135 B2 * 12/2006 Martin et al. ............... 362/294
7,144,140 B2 * 12/2006 Sun et al. .................... 362/373
7,458,706 B1 * 12/2008 Liu et al. .................... 362/373

* cited by examiner

*Primary Examiner*—Stephen F Husar
*Assistant Examiner*—James W Cranson
(74) *Attorney, Agent, or Firm*—Troxell Law Office, PLLC

(57) ABSTRACT

A LED lamp includes at least one LED unit, a thermally-conductive post, a heat-dissipating module, at least one metal base, at least one cover member, at least one light reflection member, a sheath, a foundation, and a printed circuit board (PCB). The heat-dissipating module is provided with a plurality of heat sinks, each of which has one end serially connected to each other and radially arranged on an outer periphery of the thermally-conductive post, and the other end apart from each other, so as to constitute the heat-dissipating module. The sheath is used to surround and position the heat sinks, so that the heat sinks are confined. The LED unit is mounted on the metal base, which is received in a step portion formed on a central portion of each of the heat sinks. The light reflection member is provided with a curved focusing portion for focusing a light source projected by the LED unit following by outputting the light source via the cover member. The heat generated by the LED unit can be dissipated to the thermally-conductive post via the metal base, and then the heat will be dissipated from the thermally-conductive post to the heat-dissipating module constructed from the heat sinks that are in contact with the thermally-conductive post, so as to dissipate the heat to the atmosphere.

8 Claims, 6 Drawing Sheets

LED LAMP WITH PLURAL RADIALLY ARRANGED HEAT SINKS

BACKGROUND OF INVENTION

1. Field of the Invention

The present invention relates to a LED (light emitting diode) lamp, and more particularly to a LED lamp having a LED unit and a plurality of heat sinks surrounding the LED unit for efficiently dissipating the heat generated by the LED unit.

2. Description of the Prior Art

Presently, projection lamps have a considerable market share among all of commercially available lamps. Especially, when various power-saving electronic lamps are used to replace traditional fluorescent lamps, the projection lamps still play an important role due to the fact that the projection lamps further providing a particular illuminating effect. For example, when decorating various house environments, exhibition places, showrooms, or restaurants, the projection lamps are inevitably used to create a mood for focusing on exhibited trade articles or decorations. Because the projection lamps have the considerable market share, various specifications of the projection lamps have been standardized. However, traditional projection lamps are generally halide projection lamps with a specification of 110 Volt, which results in increasing power consumption and generation of heat, so that the life span thereof is shortened relatively (only about several months). With the trend of higher and higher power rate, the traditional halide projection lamps are uneconomical and may cause an environmental issue; while the generated heat easily causes accidents such as cable fires.

To solve the foregoing problems, related manufacturers further developed projection lamps having LEDs (light emitting diodes) as a power-saving light source, so as to replace the traditional halide projection lamps. Referring now to FIG. 1, a schematic view of a traditional LED projection lamp is illustrated. The traditional LED projection lamp designated by numeral 1 comprises an outer casing 11, a voltage conversion unit 12, and a LED unit 13. The LED unit 13 and the voltage conversion unit 12 are mounted in the outer casing 11. The voltage conversion unit 12 is used to convert an AC power of 110V into a DC power applied to the LED unit 13, so that the LED unit 13 can illuminate for a projection purpose.

However, although the traditional LED projection lamp 1 provides a power-saving advantage relative to the traditional halide projection lamp, the traditional LED projection lamp 1 still has the foregoing problem of heat dissipation. In other words, the LED unit 13 must have a predetermined illumination in order to provide an effect of focusing on a spot target. Although the illumination of the LED unit 13 is continuously increasing with the advance of lamp technology, the heat-dissipation problem of the LED unit 13 is more and more serious. Especially, in comparison with the traditional halide projection lamp, the LED unit 13 only has a lower heat-resistant property. Once an operation temperature is greater than a predetermined heat-resistant temperature of the LED unit 13, the illumination of the LED unit 13 will be gradually decreased, so that the LED unit 13 can no longer provide the predetermined illumination and the life span thereof will be shortened.

Even though the traditional LED projection lamp 1 has the heat-dissipation problem, the traditional LED projection lamp 1 is still not provided with any heat-dissipation structure for dissipating heat. The heat generated by the LED unit 13 can only be dissipated to the atmosphere by the outer casing 11 made of metal, so that the traditional LED projection lamp 1 only provides a relatively lower heat-dissipation efficiency. Hence, the traditional LED projection lamp 1 can only use the LED unit 13 with a maximum power specification up to 1 Watt due to the heat-dissipation problem, so that the total illumination of the traditional LED projection lamp 1 is limited and the traditional LED projection lamp 1 cannot be used to completely replace the traditional halide projection lamp. As a result, the traditional halide projection lamp with the higher power consumption and the more heat generation still has a considerable market share, which leads to unnecessary waste of the limited energy resources in the world.

It is therefore tried by the inventor to develop a LED lamp to solve the problems existing in the traditional LED projection lamp as described above.

SUMMARY OF INVENTION

A primary object of the present invention is to provide a LED lamp, which is provided with a heat-dissipating module to substantially increase total heat-dissipating area, so as to improve and enhance the overall heat-dissipating efficiency.

A secondary object of the present invention is to provide a LED lamp, which is provided with a heat-dissipating module having a plurality of heat sinks and a sheath for surrounding and positioning the heat sinks, so that the heat sinks are confined to ensure the operation safety and increase the structural strength of the heat-dissipating module.

A third object of the present invention is to provide a LED lamp, which is provided with at least one LED unit for generating a light source and a cover member for evenly projecting the light source and providing a dust-proof effect.

A fourth object of the present invention is to provide a LED lamp, which is provided with at least one LED unit for generating a light source, a metal base, and a light reflection member for reflecting and concentrating the light source, so as to prevent the loss of the light source and to cover the metal base for the purpose of decoration.

In order to achieve the above mentioned objects, the present invention discloses an embodiment of light emitting diode (LED) lamp which comprises:

at least one LED unit;

a thermally-conductive post being a column having an upper end and a lower end, wherein the upper end is provided with at least one through hole;

a heat-dissipating module provided with a plurality of heat sinks, wherein each of the heat sinks has one end serially connected to each other and radially arranged on an outer periphery of the thermally-conductive post, and the other end apart from each other, so as to constitute the heat-dissipating module; and wherein the heat sinks are extended outward about a predetermined length in relation to the upper end of the thermally-conductive post, such that each of the heat sinks is formed with a step portion and all of the step portions are arranged coaxial to the thermally-conductive post and surrounding the upper end thereof;

at least one base for mounting the LED unit thereon, wherein the base is mounted in the step portions formed on a central portion of the heat sinks of the heat-dissipating module;

at least one cover member mounted in the step portions formed on the central portion of the heat sinks of the heat-dissipating module for covering the LED unit;

a sheath for surrounding and positioning the heat sinks of the heat-dissipating module, so that the heat sinks are confined by the sheath;

a foundation being a hollow housing provided with an opening on an upper end thereof, wherein the opening positions the heat sinks surrounding the lower end of the thermally-conductive post; and a printed circuit board (PCB) provided with a circuit, and mounted in the foundation, wherein the circuit of the PCB is electrically connected to the LED unit mounted on the base via the through hole of the thermally-conductive post.

In a preferred embodiment, the LED lamp further comprises at least one light reflection member received in the step portion formed on the central portion of the heat sinks of the heat-dissipating module and mounted on the base, wherein the light reflection member is provided with a curved focusing portion and a through hole formed on a central portion of the curved focusing portion, so that the LED unit mounted on the base is received in the through hole; and wherein the light reflection member is further provided with an engaging flange on an outer edge of the curved focusing portion for engaging with the cover member.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION

Figure 1:
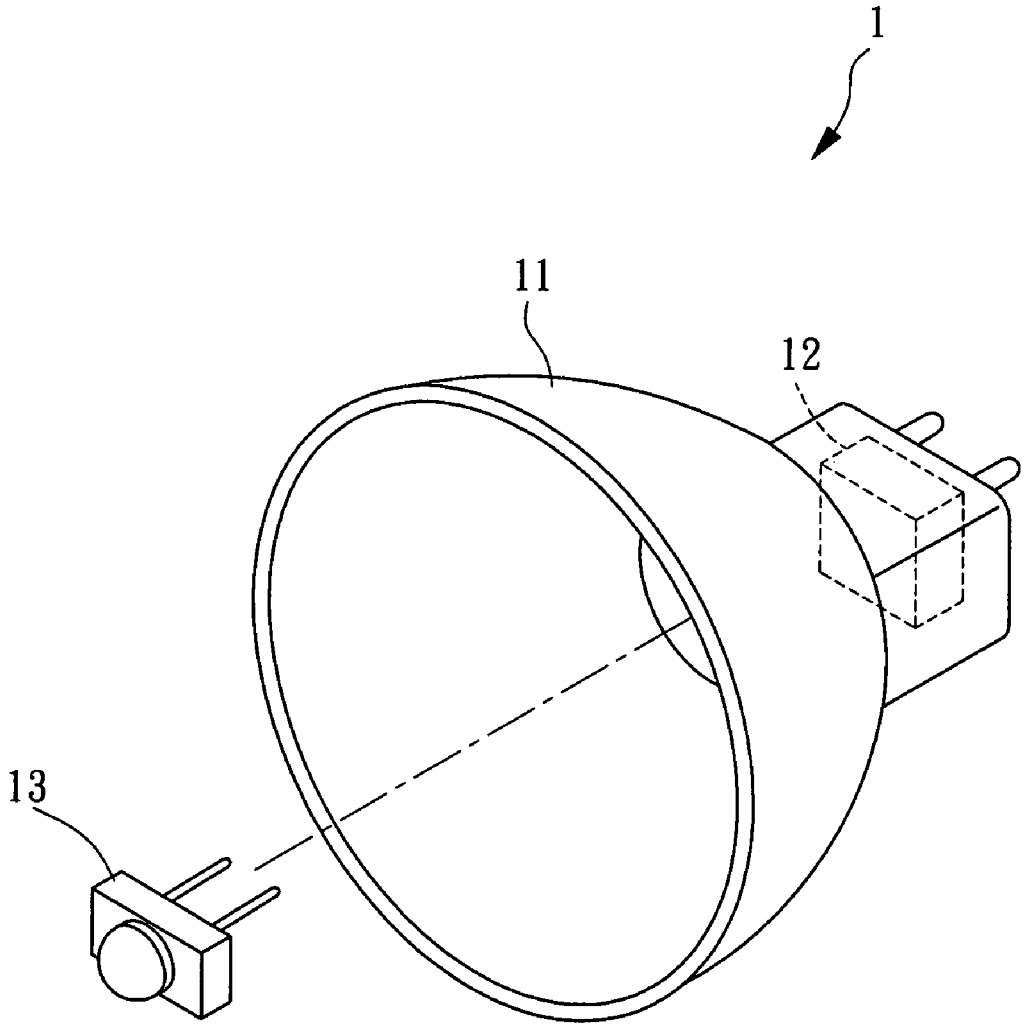
FIG. 1 (PRIOR ART)
FIG. 1 is a schematic view of a traditional LED projection lamp.
Figure 2:
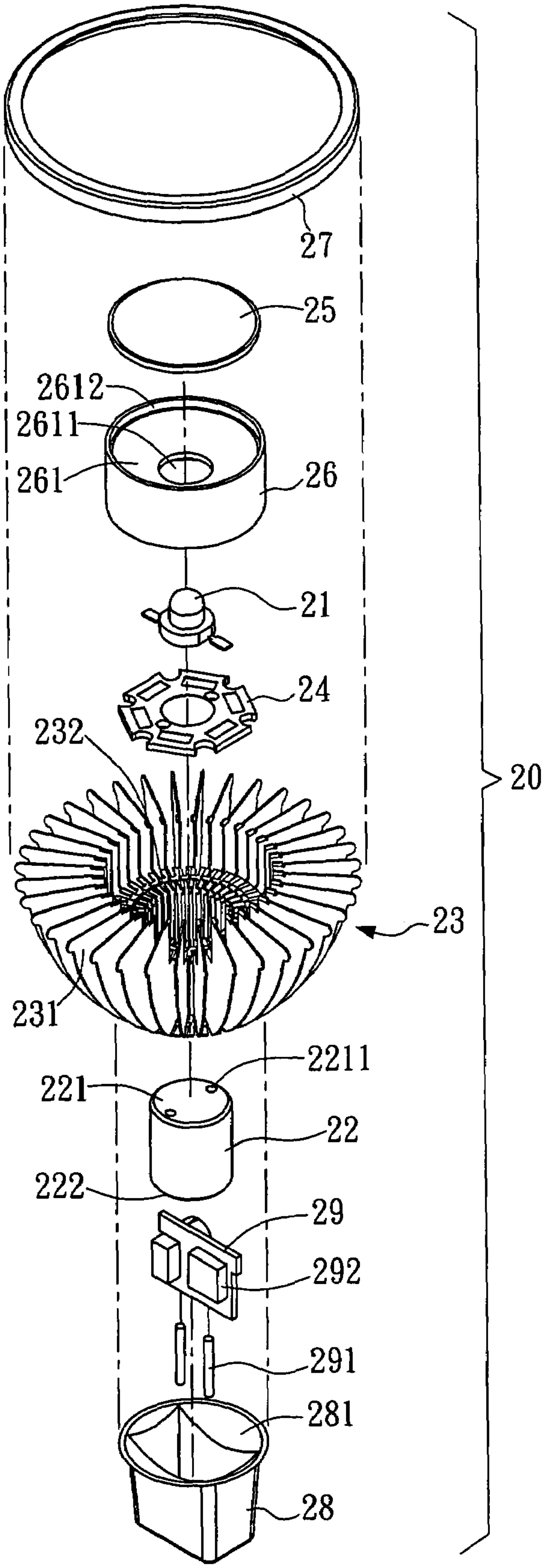
FIG. 2 is an exploded perspective view of a LED lamp according to a first preferred embodiment of the present invention.
Figure 3:
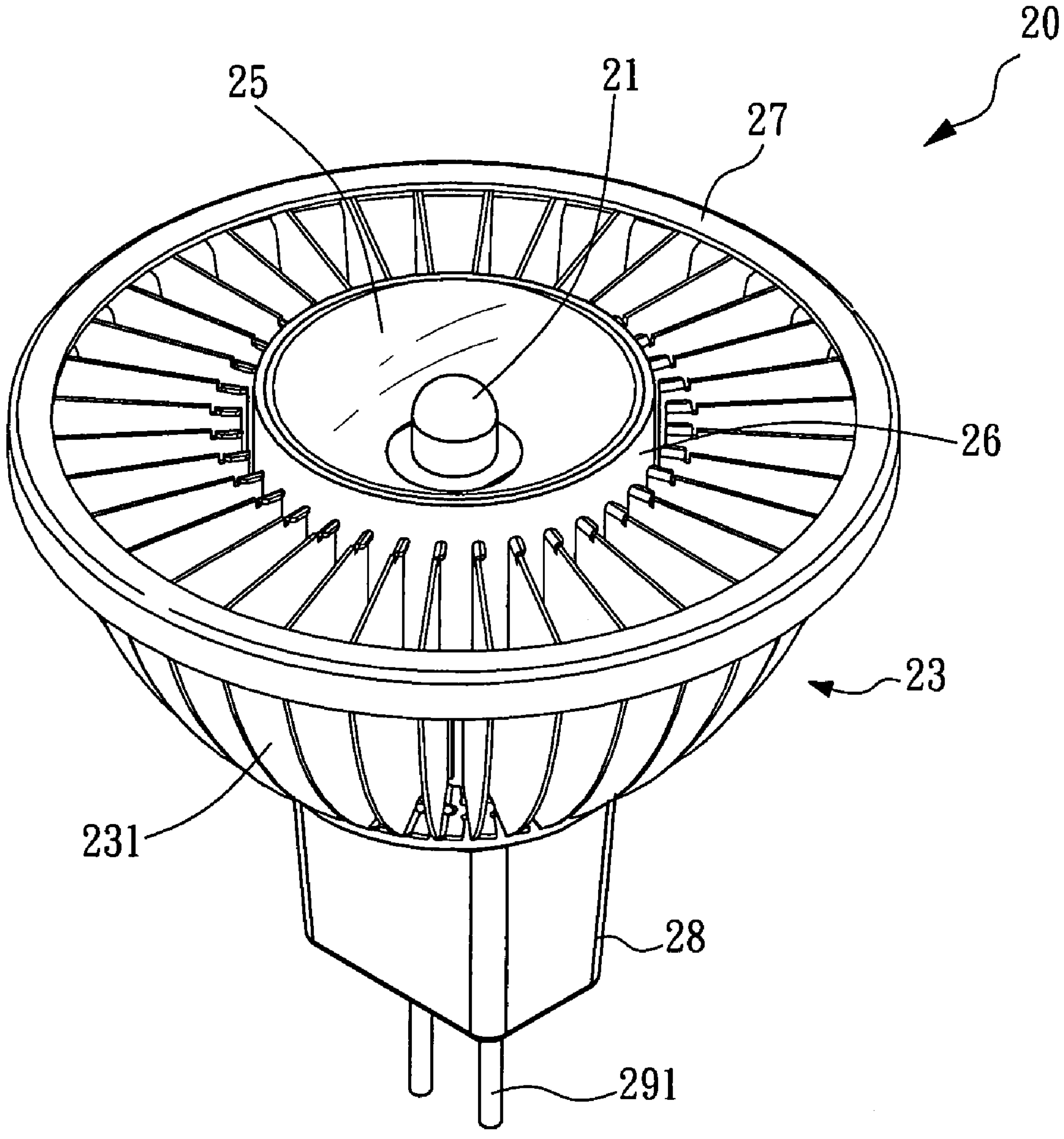
FIG. 3 is an assembled perspective view of the LED lamp according to the first preferred embodiment of the present invention.

Referring now to FIGS. 2 and 3, an exploded perspective view and an assembled perspective view of a LED (light emitting diode) lamp according to a first preferred embodiment of the present invention are illustrated. As shown, the LED lamp designated by numeral 20 comprises at least one LED unit 21, a thermally-conductive post 22, a heat-dissipating module 23, at least one metal base 24, at least one cover member 25, at least one light reflection member 26, a sheath 27, a foundation 28, and a printed circuit board (PCB) 29. The heat-dissipating module 23 is provided with a plurality of heat sinks 231.

Referring still to FIGS. 2 and 3, in the first preferred embodiment of the present invention, the thermally-conductive post 22 is a column having an upper end 221 and a lower end 222, wherein the upper end 221 is provided with at least one through hole 2211. The thermally-conductive post 22 is preferably made of metal or alloy with a high thermal conductivity, such as iron, copper, aluminum, silver, gold, and their alloy. Each of the heat sinks 231 of the heat-dissipating module 23 has one end serially connected to each other and radially arranged on an outer periphery of the thermally-conductive post 22, and the other end apart from each other, so as to constitute a circular structure of the heat-dissipating module 23. Furthermore, the heat sinks 231 are extended outward about a predetermined length in relation to the upper end 221 of the thermally-conductive post 22. Each of the heat sinks 231 is formed with a step portion 232, while all of the step portions 232 are arranged coaxial to the thermally-conductive post 22 and surrounding the upper end 221 thereof. The heat sinks 231 of the heat-dissipating module 23 are preferably made of metal or alloy with a high thermal conductivity, such as iron, copper, aluminum, silver, gold, and their alloy.

Referring still to FIGS. 2 and 3, in the first preferred embodiment of the present invention, the metal base 24 is used to mount the LED unit 21 thereon, while the metal base 24 is mounted in the step portions 232 formed on a central portion of the heat sinks 231. Moreover, the metal base 24 is further used to mount a plurality of electronic elements (not shown), such as ICs and capacitors, for adjusting the power of the LED unit 21. Especially, the metal base 24 is further used to dissipate heat generated by the LED unit 21 via the heat sinks 231 to the atmosphere during illuminating. Preferably, the metal base 24 is further provided with epoxy resin to prevent the electronic elements (ICs and capacitors) and the LED unit 21 from contacting with each other and leading to short circuit. In an alternative preferred embodiment of the present invention, the metal base 24 can be replaced by a plastic base made of a high heat-resistant plastic material.

Referring still to FIGS. 2 and 3 again, in the first preferred embodiment of the present invention, the cover member 25 is mounted in the step portion 232 formed on the central portion of the heat sink 231 of the heat-dissipating module 23, while the cover member 25 is above a light source projected by the LED unit 21, so as to evenly distribute the light source and to prevent from scattering. The cover member 25 can be selected from the group consisting of a convex lens, a concave lens, a planar lens, and a light diffusion plate.

Referring still to FIGS. 2 and 3, in the first preferred embodiment of the present invention, the light reflection member 26 is received in the step portion 232 formed on the central portion of the heat sink 231 of the heat-dissipating module 23, and mounted on the metal base 24. The light reflection member 26 is provided with a curved focusing portion 261 and a through hole 2611 formed on a central portion of the curved focusing portion 261, so that the LED unit 21 mounted on the metal base 24 can be received in the through hole 2611. As a result, the light source projected by the LED unit 21 can be focused by the curved focusing portion 261 of the light reflection member 26. Furthermore, the light reflection member 26 covers the metal base 24, so as to provide a dust-proof effect and a decoration effect.

Referring still to FIGS. 2 and 3, in the first preferred embodiment of the present invention, because the LED unit 21 is received in the through hole 2611 of the light reflection member 26 and mounted on the metal base 24, the light source projected by the LED unit 21 will not be scattered from a slit defined between any two of the heat sinks 231 of the heat-dissipating module 23, so as to improve and enhance the illuminating efficiency. Furthermore, the light reflection member 26 is provided with an engaging flange 2612 on an outer edge of the curved focusing portion 261 for engaging with the cover member 25.

Referring still to FIGS. 2 and 3, in the first preferred embodiment of the present invention, the sheath 27 is used to surround and position the heat sinks 231, so that the heat sinks 231 are confined to ensure operation safety. For example, when a user assembles (or detaches) the LED lamp 20, the user can hold the sheath 27 to prevent from being cut by the sharp outer edge of the heat sinks 231. Moreover, the user can easily exert a force upon the sheath 27 surrounding the heat sinks 231, and the sheath 27 can increase the structural strength of the heat-dissipating module 23 to protect the heat sinks 231 from being deformed or shifted by an external impact.

Referring still to FIGS. 2 and 3, in the first preferred embodiment of the present invention, the foundation 28 is a hollow housing provided with a curved opening 281 on an upper end thereof, wherein the curved opening 281 is used to position the heat sinks 231 surrounding the lower end 222 of the thermally-conductive post 22. Furthermore, the PCB 29 comprises a circuit (not shown) therein, and is mounted in the foundation 28. The circuit of the PCB 29 is electrically connected to the LED unit 21 mounted on the metal base 24 via the through hole 2211 of the thermally-conductive post 22. The PCB 29 is further provided with at least one terminal 291 and a voltage conversion unit 292. The terminal 291 is extended through the foundation 28 for being electrically connected an external power source (not shown) to the PCB 29 mounted in the foundation 28, while the voltage conversion unit 292 is used to convert an AC power of 110V or 220V from the external power source into a DC power applied to the LED unit 21, so that the LED unit 13 can illuminate for a projection purpose. In the first preferred embodiment of the present invention, the specification of the foundation 28 and the PCB 29 can be the same as that of traditional projection lamps for a projection purpose.

Figure 4:
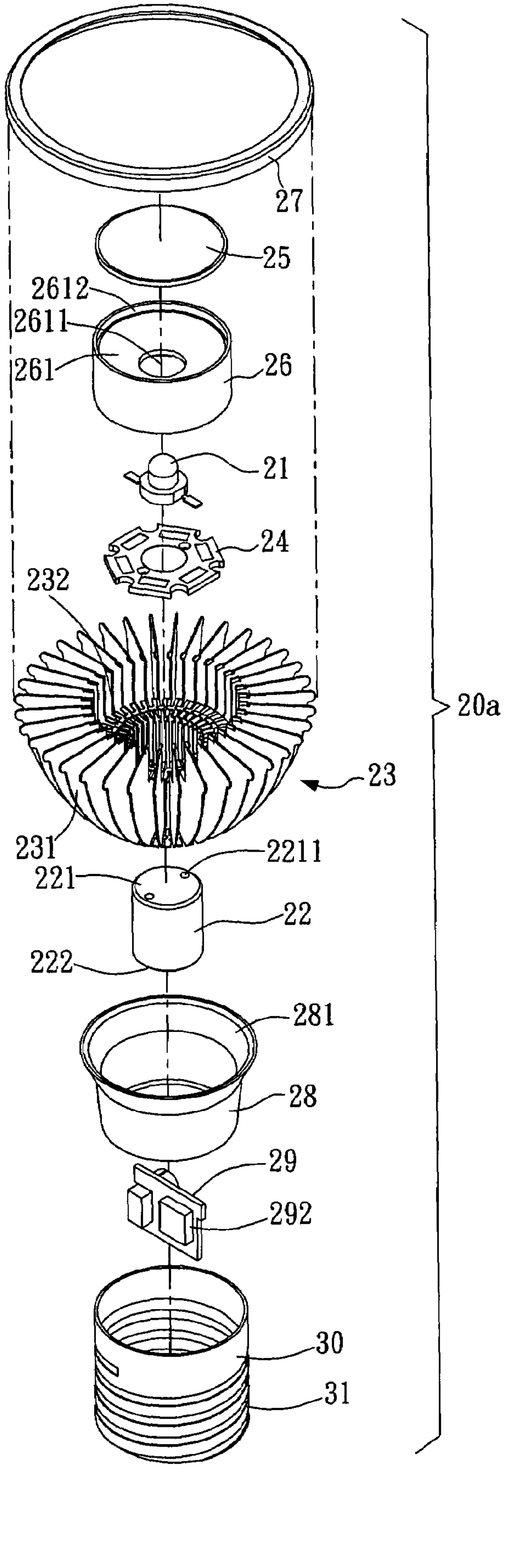
FIG. 4 is an exploded perspective view of a LED lamp according to a second preferred embodiment of the present invention.

Referring now to FIG. 4, an exploded perspective view of a LED lamp according to a second preferred embodiment of the present invention is illustrated and similar to the first preferred embodiment shown in FIG. 2, so that some elements of the second preferred embodiment similar to that of the first preferred embodiment will be designated by the same numerals and the detailed description thereof will be omitted.

Referring still to FIG. 4, in comparison with the first preferred embodiment, the LED lamp of the second preferred embodiment of the present invention designated by numeral 20*a* further comprises a terminal housing 30 connected to another end (i.e. a lower end) of the foundation 28 opposite to the curved opening 281, wherein the terminal housing 30 is provided with an electrically conductive thread 31 formed on an outer periphery thereof for being electrically connected to the PCB 29, so that the electrically conductive thread 31 of the terminal housing 30 can be used to replace the terminal 291 of the PCB 29 of the first preferred embodiment shown in FIG. 2.

Referring still to FIG. 4, in the second preferred embodiment of the present invention, the specification of the foundation 28 and the terminal housing 30 can be corresponding to that of various metal screwing adapters of traditional tungsten lamps, such as adapter specifications of E10, E12, E14, E17, E27, or E40, wherein the number behind the letter "E" means the diameter of the metal screwing adapters. For example, the specification of traditional household tungsten lamps is generally the E27 specification, i.e. the diameter of the metal screwing adapters thereof is 27 mm (or 2.7 cm).

Figure 5:
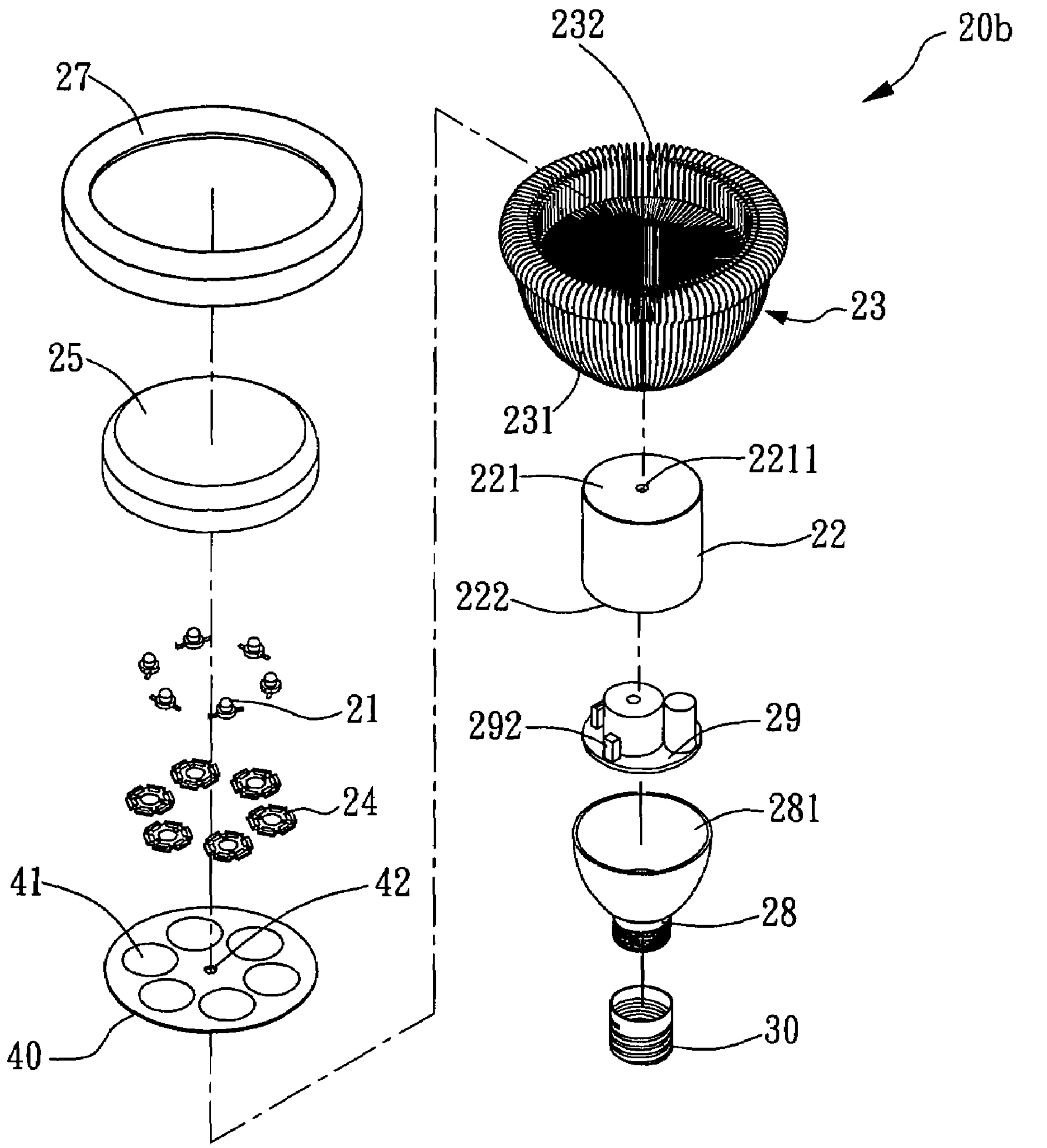
FIG. 5 is an exploded perspective view of a LED lamp according to a third preferred embodiment of the present invention.

Referring now to FIG. 5, an exploded perspective view of a LED lamp according to a third preferred embodiment of the present invention is illustrated and similar to the second preferred embodiment shown in FIG. 4, so that some elements of the third preferred embodiment similar to that of the second preferred embodiment will be designated by the same numerals and the detailed description thereof will be omitted.

Referring still to FIG. 5, in comparison with the second preferred embodiment, the LED lamp of the third preferred embodiment of the present invention designated by numeral 20*b* comprises a plurality of the LED units 21, and further comprises a thermally-conductive base 40 mounted in the step portion 232 of the heat-dissipating module 23. The thermally-conductive base 40 is provided with a plurality of positioning portions 41 corresponding to a plurality of the metal bases 24, so that each of the metal bases 24 respectively receives each of the LED units 21, while each of the metal bases 24 is respectively positioned in the positioning portions 41. Furthermore, the thermally-conductive base 40 is provided with a through hole 42 on a central portion thereof, so that the plurality of the metal bases 24 can be electrically connected to the PCB 29 in the foundation 28 via wires (not shown) extended through the through hole 42. Moreover, the thermally-conductive base 40 has a lower surface attached to an upper edge of each of the heat sinks 231 located at the step portion 232 of the heat-dissipating module 23. Because heat generated by the LED units 21 mounted on the metal bases 24 can be dissipated to the heat-dissipating module 23 via the thermally-conductive base 40, the thermally-conductive base 40 can be used to increase a contact area between the metal bases 24 and the step portion 232 of the heat-dissipating module 23, and the heat sinks 231 can be used to improve the heat-dissipating efficiency of the metal bases 24 by speedily dissipating the heat thereof.

Referring still to FIG. 5, in comparison with the second preferred embodiment which the light reflection member 26 is mounted on the metal base 24, the LED lamp 20*b* of the third preferred embodiment of the present invention omits the light reflection member 26, and only the thermally-conductive base 40 mounted in the step portion 232 of the heat-dissipating module 23 is used to support the plurality of the LED units 21 and the plurality of the metal bases 24. Meanwhile, the common cover member 25 is used to evenly distribute the light source projected by all of the LED units 21 during the light source penetrates through the cover member 25, so that the LED lamp 20*b* will output an evenly distributed light source with a higher illumination.

Figure 6:
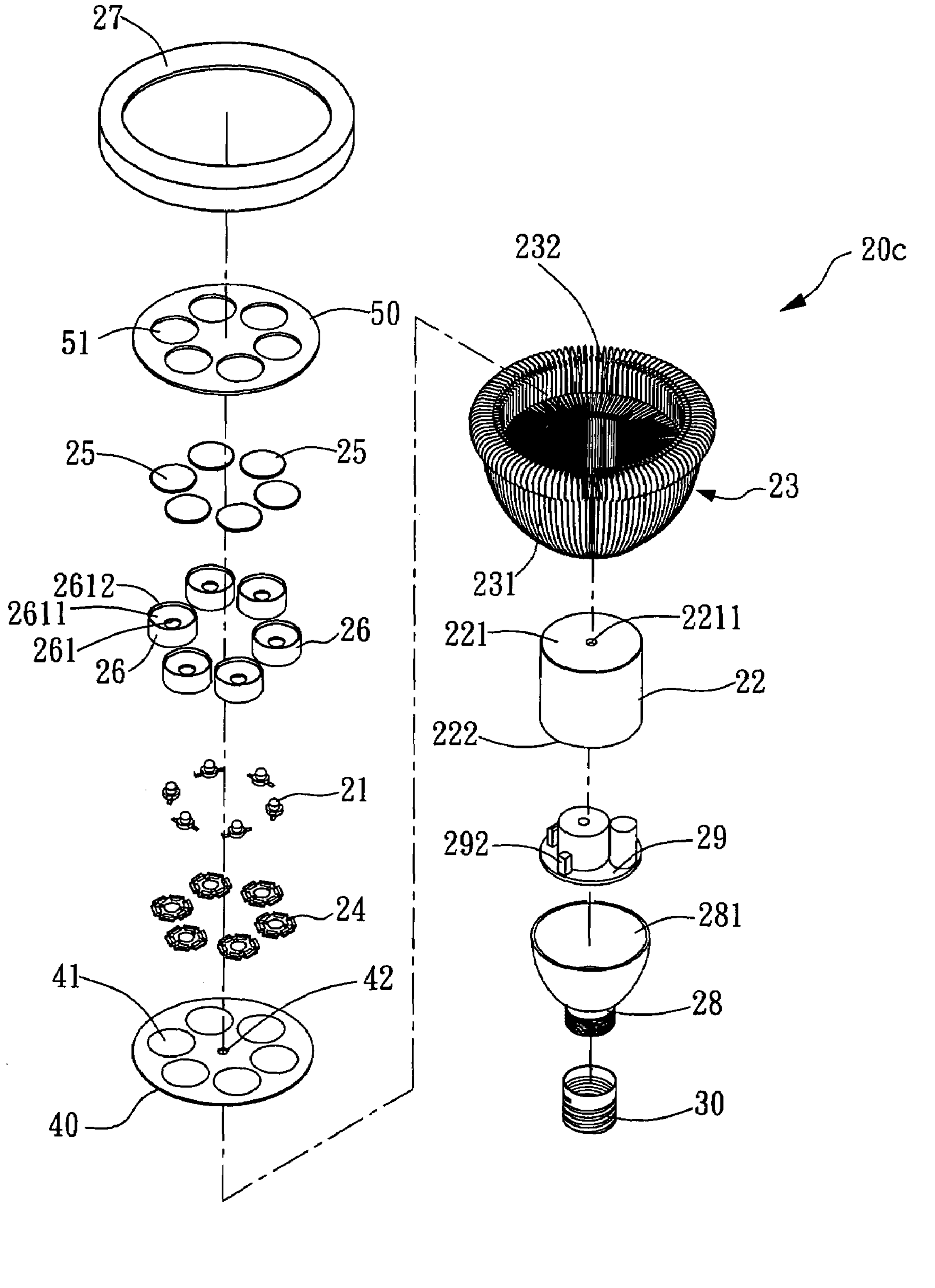
FIG. 6 is an exploded perspective view of a LED lamp according to a fourth preferred embodiment of the present invention.

Referring now to FIG. 6, an exploded perspective view of a LED lamp according to a fourth preferred embodiment of the present invention is illustrated and similar to the third preferred embodiment shown in FIG. 5, so that some elements of the fourth preferred embodiment similar to that of the third preferred embodiment will be designated by the same numerals and the detailed description thereof will be omitted.

Referring still to FIG. 6, in comparison with the third preferred embodiment, the LED lamp of the fourth preferred embodiment of the present invention designated by numeral 20*c* further comprises a plurality of the light reflection members 26 mounted on the plurality of the metal bases 24, respectively, wherein the plurality of the LED units 21 are received in the through holes 2611 formed on the central portion of the curved focusing portion 261 of the light reflection members 26, respectively. Meanwhile, the plurality of the cover members 25 are engaged with the engaging flanges 2612 of the light reflection members 26, respectively. As a result, each of the LED units 21 is surrounded by the curved focusing portion 261 of the light reflection members 26, so that the light source projected by each of the LED units 21 in each of the curved focusing portion 261 can be focused by the curved focusing portion 261 of the light reflection member 26. Meanwhile, each of the cover members 25 is used to respectively and evenly distribute the light sources projected by each of the LED units 21 during each of the light source penetrates through the corresponding cover member 25, so that the LED lamp 20*c* will focus and output a plurality of independently evenly distributed light sources projected by the plurality of the LED units 21.

Referring still to FIG. 6, the LED lamp 20*c* of the fourth preferred embodiment of the present invention further comprises a protecting plate 50 provided with a plurality of positioning holes 51 thereon. The positioning holes 51 of the protecting plate 50 are used to position the cover members 25 and the light reflection members 26 therein. Meanwhile, a combination of the protecting plate 50, the cover members 25, and the light reflection members 26 is received in the step portions 232 of the heat-dissipating module 23, so that the step portions 232 of the heat-dissipating module 23 will be sealed by the combination thereof. As a result, the protecting plate 50 can precisely position the cover members 25 and the light reflection members 26, while providing a dust-proof effect for preventing the lamp from dusts or foreign matters, and a decoration effect for covering all electronic elements (not shown) in the LED lamp 20*c*. In an alternative preferred embodiment of the present invention, the protecting plate 50 can be made of a transparent material, and integrated with the plurality of the cover members 25 into one piece.

As described above, each of the LED lamps 20, 20*a*, 20*b*, and 20*c* of the present invention is provided with the heat-dissipating module 23 constructed from the plurality of the heat sinks 231, wherein each of the heat sinks 231 has one end serially connected to each other and radially arranged on an outer periphery of the thermally-conductive post 22, and the other end apart from each other, so as to constitute a circular structure of the heat-dissipating module 23. Moreover, the sheath 27 is used to surround and position the heat sinks 231, so that the heat sinks 231 are confined to ensure the operation convenience and safety for being easily held by the user and preventing the user from being cut. Moreover, the LED unit 21 is mounted on the metal base 24, while the metal base 24 is mounted in the step portions 232 formed on the central portion of the heat sinks 231. As a result, the light source projected by the LED unit 21 can be focused by the curved focusing portion 261 of the light reflection member 26, and followed by outputting the light source via the cover member 25. Furthermore, the heat generated by the LED unit 21 can be dissipated to the thermally-conductive post 22 via the metal base 24, and then the heat will be dissipated from the thermally-conductive post 22 to the heat-dissipating module 23 constructed from the heat sinks 231, which are in contact with the thermally-conductive post 22, so as to dissipate the heat to the atmosphere.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A light emitting diode (LED) lamp, comprising:

at least one LED unit;

a thermally-conductive post being a column having an upper end and a lower end, wherein the upper end is provided with at least one through hole;

a heat-dissipating module provided with a plurality of heat sinks, wherein each of the heat sinks has one end serially connected to each other and radially arranged on an outer periphery of the thermally-conductive post, and the other end apart from each other, so as to constitute the heat-dissipating module; and wherein the heat sinks are extended outward about a predetermined length in relation to the upper end of the thermally-conductive post, such that each of the heat sinks is formed with a step portion and all of the step portions are arranged coaxial to the thermally-conductive post and surrounding the upper end thereof;

at least one base for mounting the LED unit thereon, wherein the base is mounted in the step portions formed on a central portion of the heat sinks of the heat-dissipating module;

at least one cover member mounted in the step portions formed on the central portion of the heat sinks of the heat-dissipating module for covering the LED unit;

a sheath for surrounding and positioning the heat sinks of the heat-dissipating module, so that the heat sinks are confined by the sheath;

a foundation being a hollow housing provided with an opening on an upper end thereof, wherein the opening positions the heat sinks surrounding the lower end of the thermally-conductive post; and a printed circuit board (PCB) provided with a circuit, and mounted in the foundation, wherein the circuit of the PCB is electrically connected to the LED unit mounted on the base via the through hole of the thermally-conductive post.

2. The LED lamp of claim 1, further comprising at least one light reflection member received in the step portion formed on the central portion of the heat sinks of the heat-dissipating module and mounted on the base, wherein the light reflection member is provided with a curved focusing portion and a through hole formed on a central portion of the curved focusing portion, so that the LED unit mounted on the base is received in the through hole; and wherein the light reflection member is further provided with an engaging flange on an outer edge of the curved focusing portion for engaging with the cover member.

3. The LED lamp of claim 1, wherein the cover member is selected from the group consisting of a convex lens, a concave lens, a planar lens, and a light diffusion plate.

4. The LED lamp of claim 1, further comprising a thermally-conductive base mounted in the step portion of the heat-dissipating module, wherein the thermally-conductive base is provided with at least one positioning portion corresponding to the at least one bases, so that the bases is positioned in the positioning portion.

5. The LED lamp of claim 1, wherein the PCB further comprises at least one terminal extended through the foundation for being electrically connected to the PCB mounted in the foundation.

6. The LED lamp of claim 1, further comprising a terminal housing connected to an end of the foundation opposite to the opening of the foundation, wherein the terminal housing is provided with an electrically conductive thread formed on an outer periphery thereof for being electrically connected to the PCB.

7. The LED lamp of claim 1, wherein the PCB further comprises a voltage conversion unit for converting an AC power into a DC power.

8. The LED lamp of claim 2, further comprising a protecting plate provided with at least one positioning hole thereon for positioning the at least one light reflection member therein, and a combination of the protecting plate and the light reflection member is received in the step portions of the heat-dissipating module, so that the step portions is sealed.

* * * * *